United States Patent [19]

Foggini

[11] Patent Number: 4,598,606
[45] Date of Patent: Jul. 8, 1986

[54] CONTROL LEVER, IN PARTICULAR A GEARSHIFT CONTROL LEVER FOR MOTOR VEHICLES, AND METHOD FOR THE MANUFACTURE THEREOF

[75] Inventor: Giovanni Foggini, Turin, Italy

[73] Assignee: Lear S.n.c. di Foggini & C., Orbassano, Italy

[21] Appl. No.: 449,939

[22] Filed: Dec. 15, 1982

[30] Foreign Application Priority Data

Dec. 21, 1981 [IT] Italy ................... 68651 A/81

[51] Int. Cl.[4] .............................................. G05G 1/04
[52] U.S. Cl. ........................................ 74/523; 74/566; 74/473 R
[58] Field of Search ............... 74/558.5, 471 XY, 469, 74/543, 473 R, 471 R, 491, 523, 566; 403/50, 51, 134

[56] References Cited

U.S. PATENT DOCUMENTS

| | | | |
|---|---|---|---|
| 2,272,897 | 2/1942 | Riesing | 74/523 |
| 3,420,119 | 1/1969 | Morse | 74/558.5 |
| 3,680,405 | 8/1972 | Naumann et al. | 74/523 |
| 3,693,467 | 9/1972 | Oehl | 74/523 |
| 3,732,746 | 5/1973 | Fitzpatrick | 74/523 |
| 3,750,492 | 8/1973 | Holmes | 74/523 |
| 3,760,651 | 9/1973 | Roseby | 74/523 |
| 4,197,611 | 4/1980 | Bell et al. | 74/558.5 |

Primary Examiner—Kenneth J. Dorner
Assistant Examiner—Vinh Luong
Attorney, Agent, or Firm—Guido Modiano; Albert Josif

[57] ABSTRACT

The lever comprises an integral covering which includes the handgrip knob and protective bellows for the swivel joint and incorporates, as a unitary construction, the lever load bearing rod which lever is formed by a co-molding process, whereby the load-bearing rod is incorporated to the covering during the injection molding of the covering itself.

6 Claims, 6 Drawing Figures

CONTROL LEVER, IN PARTICULAR A GEARSHIFT CONTROL LEVER FOR MOTOR VEHICLES, AND METHOD FOR THE MANUFACTURE THEREOF

BACKGROUND OF THE INVENTION

This invention relates to a control lever, in particular a gearshift control lever for motorvehicles, and to a method for the manufacture thereof.

More specifically, this invention concerns a control lever which conprises an integral covering of a moldable polymeric material, incorporating both the handgrip knob and the protective bellows for the lever swivel joint.

Integral coverings have been produced by the applicant in which the coverings were produced separately by a molding process and subsequently fitted onto the lever, whereto they are attached through snap-action engagement of mutually coupleable portions provided at the lever end, and respectively into a retaining insert embedded in the covering at the knob.

SUMMARY OF THE INVENTION

Thus, a rather thick lever was produced, with a poor inertial behaviour as relates to vibration stress.

Moreover the separately manufactured coverings require a great deal of labour to be made, since the making thereof involves a great number of assembling operations, thereby considerably increasing the cost of the finished article.

Accordingly, in the light of the above previous experiences made by the applicant, the task of the present invention is to provide such a control lever which is altogether thinner than those produced by separately adding a preformed covering thereby providing the dual advantage of reducing the amount of the required making material and the lever overall mass, with attendant improved inertial behaviour as relates to vibration stress.

Within that task, it is a primary object of the present invention to provide such a control lever which, for the making thereof, does not require any troublesome assembling operations for fitting the covering on the lever rod, while affording the possibility of imparting said rod with optimum profiles and sections in relation with the stresses the lever undergoes in operation.

Another object of the present invention is to provide such a control lever the operating rod whereof may be formed, either in part or entirely, starting from a non-metallic material and, in particular, from a rigid polymeric material.

Yet another object of the present invention is to provide such a control lever the rod profile whereof is so designed as to allow secure anchoring of the covering thereon, thereby ruling out any chance of the covering separating and breaking even after long periods of operation.

According to one aspect of the present invention the thereinabove mentioned task and objects, as well as yet other objects which will become more apparent hereinafter, are achieved by a control lever, in particular a gearshift control lever for motorvehicles, characterized in that it comprises an integral covering, including the handgrip knob and swivel joint protective bellows, directly incorporating, to form an indivisible whole, the lever load-bearing rod.

BRIEF DESCRIPTION OF THE DRAWINGS

Further features and advantages will be more apparent from the detailed description which follows, with reference to the accompanying drawings, given herein by way of example and not of limitation, and where.

DESCRIPTION OF THE PREFERRED EMBODIMENTS

Figures 1, 2, 3:
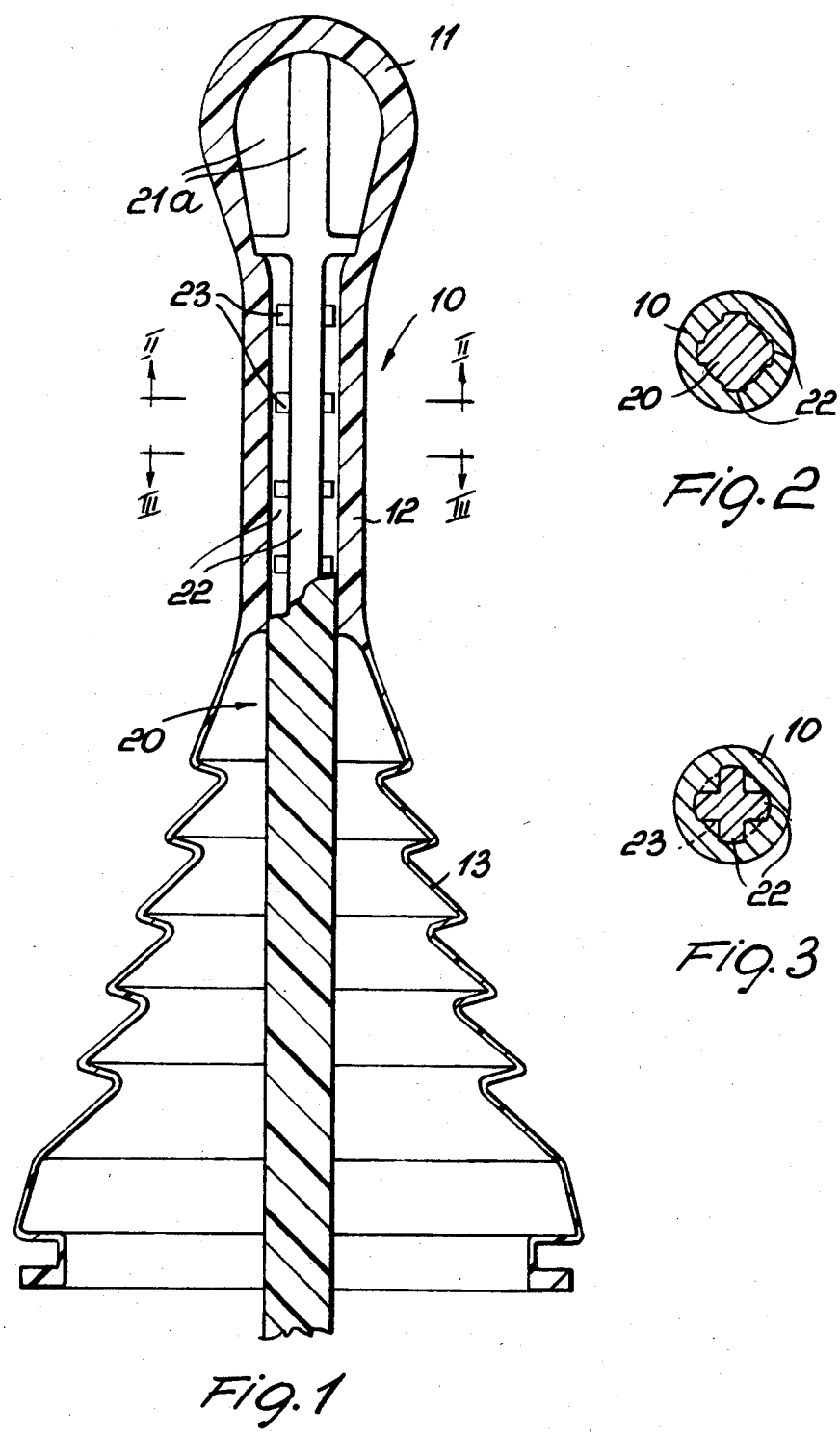
FIG. 1 is a axial sectional view of a lever according to this invention, as provided with a non-metallic load-bearing rod.
FIGS. 2 and 3 are cross-sectional views through said lever, taken along the lines II—II and III—III of FIG. 1, respectively.

Making reference to FIGS. 1 to 3, the numeral 10 generally designates the integral covering, formed from an injection moldable polymeric material and including the handgrip knob 11, the central or intermediate portion 12, and the bellows 13 protecting the lever swivel joint, as a unitized construction. Embedded in the covering 10 is the load-bearng rod 20, made of a non-metallic material, such as a rigid polymeric material, it being produced separately by a molding process. The rod 20 has an upper end portion in the zone of the knob 11, a lower end portion surrounded by the bellow-like cover portion 13 and an intermediate portion surrounded by the intermediate portion 12 of the cover structure. The rod 20 is profiled to provide high resistance to the bending stresses encountered during the lever operation, and it is formed, for this purpose, with longitudinal ribs 22 arranged crosswise to increase its moment of inertia in the vertical bending plane. Additional cross ribs 23 further cooperate to the rod stiffening, and along with the longitudinal ones form anchoring receptacles for the covering material, preventing axial and rotational movements of the latter and rod. At the upper region or end portion of the rod, the ribs 22 widen out to form a headpiece 21a which corresponds to the handgrip knob. The rod and covering are intimately coupled together by co-molding, the rod being positioned, as fabricated separately according to the specification set forth hereinabove, inside the mold for forming the covering.

Subsequently, after closing the mold, the covering material is injected with a conventional technique, said covering material fully enclosing the rod. At the bottom or lower end of the rod, a metal insert (not shown) is provided which is intended to enable coupling of the lever to the actuating linkage of the speed gear or mechanism in general whereto the lever is applied. That insert may be of considerable size, such that the rod be only in part comprised of plymeric material.

Figures 4, 5, 6:
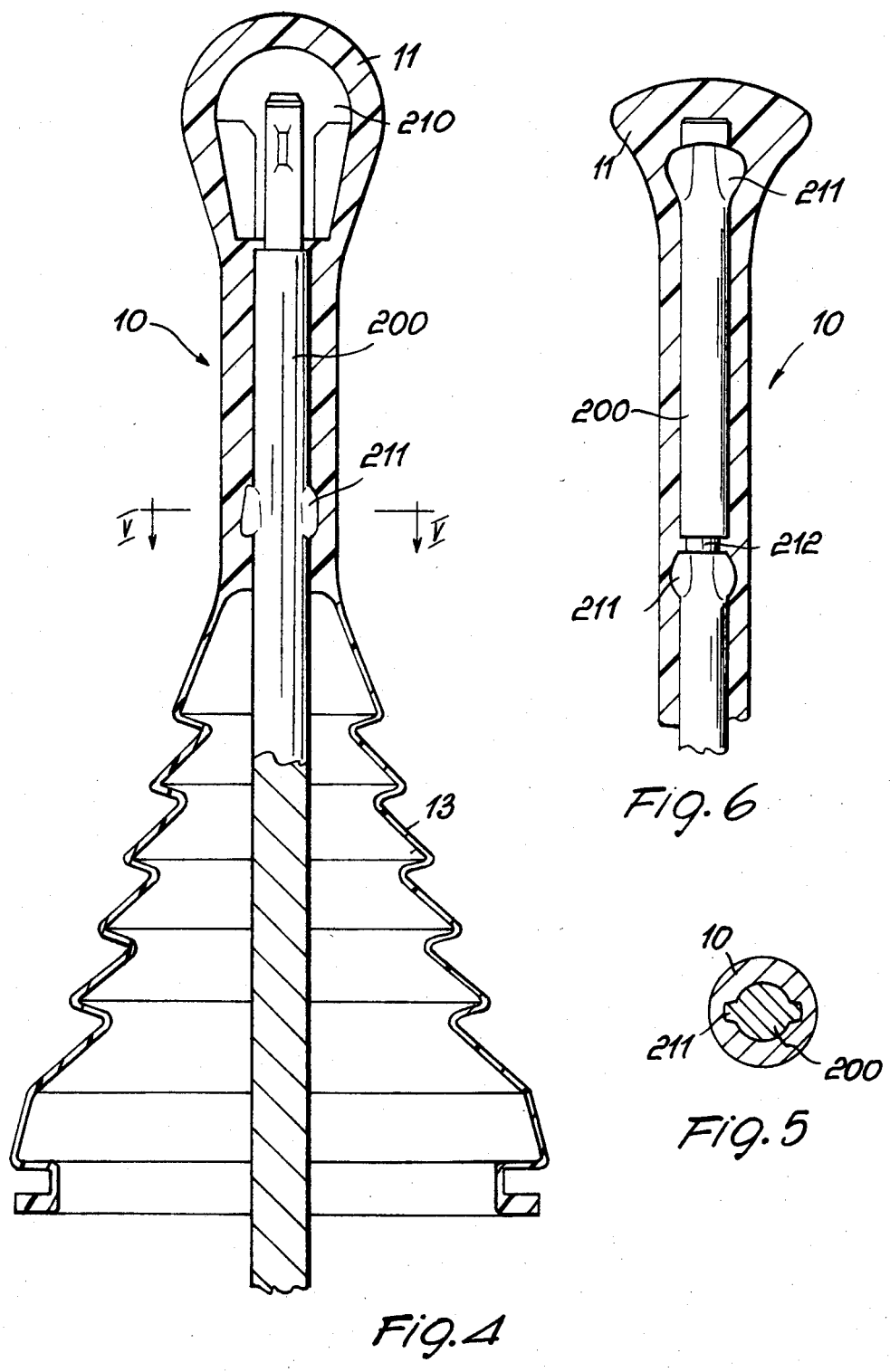
FIG. 4 is a longitudinal section view of a lever with a metal rod.
FIG. 5 is a cross-sectional view taken along the lines V—V of FIG. 4.
FIG. 6 is a fragmentary longitudinal section view, similar to the preceding ones, but showing an alternative embodiment of this lever.

The embodiment of FIG. 4 provides a structure wherein the rod 200 is instead made of metal throughout, and has a single insert 210 of a polymeric material, which is added to the end of the rod, at the knob 11 location. In this case, formed on the body of the rod are, such as by upsetting, anchoring and retaining fins 211 against rotation of the covering.

In the modified embodiment of FIG. 6, the rod 200 is of metal throughout and is formed with upsets 211 provided, in addition as on the body, also at the top end at the knob 11, which as shown, has a less pronounced profile. Moreover, for retention against axial displacement, provided on the body of the rod is at least one groove 212 whereinto, during the molding process, the covering material is allowed to set.

I claim:

1. A control lever for motorvehicles, comprising a rod at least in part of non metallic construction, said rod having a ribbed profile thereby to increase its bending strength, said rod having an upper end portion, a lower end portion for connection with a swivel joint and an intermediate portion joining said upper and said lower end portion, said ribbed profile widening out at said upper end portion to define a knob formation, a cover structure surrounding said rod, said cover structure having a first section surrounding said upper portion of said rod and said knob formation thereof and at least part of said intermediate portion thereof and in close contact and in anchoring relationship with said ribbed profile, said cover structure having further a second bellows-like section surrounding at a distance therefrom said lower end portion and at least part of said intermediate portion, said second bellows-like section of said cover structure being an integral part of said first cover section.

2. A control lever according to claim 1, wherein said ribbed profile comprises longitudinal ribs extending along said rod.

3. A control lever according to claim 2, wherein said ribbed profile further comprises transverse ribs bridging said longitudinal ribs.

4. A control lever according to claim 1, wherein said rod and said cover structure are in co-molded relationship with each other.

5. A control lever for motorvehicles, comprising a rod at least in part of polymeric material, said rod having a ribbed profile thereby to increase its bending strength, said rod having an upper end portion, a lower end portion for connection with a swivel joint and an intermediate portion joining said upper and said lower end portion, said ribbed profile widening out at said upper end portion to define a knob formation, a cover structure surrounding said rod, said cover structure having a first section surrounding said upper portion of said rod and said knob formation thereof and at least part of said intermediate portion thereof and in close contact and in anchoring relationship with said ribbed profile, said cover structure having further a second bellows-like section surrounding at a distance therefrom said lower end portion and at least part of said intermediate portion, said second bellows-like section of said cover structure being an integral part of said first cover section and wherein said rod and said cover structure are in co-molded relationship with each other.

6. A gear shift lever according to claim 5 wherein said ribbed profile comprises longitudinal ribs and transverse ribs bridging said longitudinal ribs.

* * * * *